(12) United States Patent
Day et al.

(10) Patent No.: US 8,377,844 B2
(45) Date of Patent: Feb. 19, 2013

(54) THERMALLY-INSULATING LAYERS AND DIRECT THERMAL IMAGING MEMBERS CONTAINING SAME

(75) Inventors: John C. Day, Andover, MA (US); John Hardin, Hopkinton, MA (US); Yulin Hardin, Hopkinton, MA (US); Fariza B. Hasan, Waltham, MA (US); Stephen Telfer, Arlington, MA (US); William T. Vetterling, Lexington, MA (US)

(73) Assignee: Zink Imaging, Inc., Bedford, MA (US)

( * ) Notice: Subject to any disclaimer, the term of this patent is extended or adjusted under 35 U.S.C. 154(b) by 381 days.

(21) Appl. No.: 12/462,421

(22) Filed: Aug. 3, 2009

(65) Prior Publication Data

US 2010/0087316 A1      Apr. 8, 2010

Related U.S. Application Data

(60) Continuation-in-part of application No. 11/397,251, filed on Apr. 3, 2006, now Pat. No. 7,635,660, which is a continuation of application No. 10/806,749, filed on Mar. 23, 2004, now Pat. No. 7,166,558, which is a division of application No. 10/151,432, filed on May 20, 2002, now Pat. No. 6,801,233.

(Continued)

(51) Int. Cl.
*B41M 5/34* (2006.01)
(52) U.S. Cl. ........................................ 503/204; 503/226
(58) Field of Classification Search ........................ None
See application file for complete search history.

(56) References Cited

U.S. PATENT DOCUMENTS

| | | |
|---|---|---|
| 29,168 A | 7/1860 | Hernengwaris |
| 2,417,897 A | 3/1947 | Adams et al. |
| 2,995,465 A | 8/1959 | Riche, Jr. |
| 2,967,784 A | 1/1961 | Newman et al. |
| 2,995,466 A | 8/1961 | Sorensen |
| 3,076,721 A | 2/1963 | Coles |
| 3,107,174 A | 10/1963 | Wartman |
| 3,129,101 A | 4/1964 | Workman |
| 3,293,055 A | 12/1966 | Baum |
| 3,390,994 A | 7/1968 | Cescon |
| 3,488,705 A | 1/1970 | Fox et al. |
| 3,539,375 A | 11/1970 | Baum |

(Continued)

FOREIGN PATENT DOCUMENTS

| | | |
|---|---|---|
| EP | 0 405 825 | 1/1991 |
| EP | 0 530 748 | 3/1993 |

(Continued)

OTHER PUBLICATIONS

Notice of Allowance in U.S. Appl. No. 12/128,507, Date of Mailing Jun. 2, 2010.

(Continued)

*Primary Examiner* — Bruce H Hess
(74) *Attorney, Agent, or Firm* — Foley & Lardner LLP; Michel Morency

(57) ABSTRACT

Multicolor thermal imaging members are described that comprise color-forming layers that are separated by thermally-insulating layers and can be addressed with a thermal printing head in contact with a surface to form an image. The thermally-insulating layers are designed to be as thin as possible consistent with at least partially independent addressing of the color-forming layers, and are formulated so as not to lead to instabilities either before or after printing or to give rise to dimensional changes of a thermal imaging member when it is subjected to changes in temperature or humidity. Coating compositions for manufacturing such thermally-insulating layers are also provided.

8 Claims, 5 Drawing Sheets

Related U.S. Application Data

(60) Provisional application No. 60/294,486, filed on May 30, 2001, provisional application No. 60/364,198, filed on Mar. 13, 2002.

(56) References Cited

U.S. PATENT DOCUMENTS

| | | |
|---|---|---|
| 3,647,467 A | 3/1972 | Grubb |
| 3,745,009 A | 7/1973 | Jenkins et al. |
| 3,832,212 A | 8/1974 | Jenkins et al. |
| 3,895,173 A | 7/1975 | Adachi |
| 4,020,232 A | 4/1977 | Kohmura et al. |
| 4,042,392 A | 8/1977 | Gysling et al. |
| 4,242,440 A | 12/1980 | Yee et al. |
| 4,243,052 A | 1/1981 | Bailey |
| 4,250,511 A | 2/1981 | Stein et al. |
| 4,290,951 A | 9/1981 | Foley et al. |
| 4,290,955 A | 9/1981 | Cincotta et al. |
| 4,328,977 A | 5/1982 | Ozawa et al. |
| 4,380,629 A | 4/1983 | Yamashita et al. |
| 4,401,717 A | 8/1983 | Ikeda et al. |
| 4,415,633 A | 11/1983 | Nakamura et al. |
| 4,534,288 A | 8/1985 | Brovman |
| 4,598,299 A | 7/1986 | Koike et al. |
| 4,602,263 A | 7/1986 | Borror et al. |
| 4,620,204 A | 10/1986 | Inaba et al. |
| 4,627,641 A | 12/1986 | Kawaguchi |
| 4,636,819 A | 1/1987 | Nagamoto et al. |
| 4,641,147 A | 2/1987 | Sakura et al. |
| 4,660,052 A | 4/1987 | Kaiya et al. |
| 4,665,410 A | 5/1987 | Iiyama et al. |
| 4,734,704 A | 3/1988 | Mizutani et al. |
| 4,745,046 A | 5/1988 | Borror et al. |
| 4,833,488 A | 5/1989 | Mitzutani et al. |
| 4,840,933 A | 6/1989 | Usami et al. |
| 4,956,251 A | 9/1990 | Washizu et al. |
| 4,965,166 A | 10/1990 | Hosoi et al. |
| 4,997,410 A | 3/1991 | Polster et al. |
| 5,055,373 A | 10/1991 | Saeki et al. |
| 5,075,147 A | 12/1991 | Usami et al. |
| 5,119,108 A | 6/1992 | Hatakeyama |
| 5,153,169 A | 10/1992 | Freedman et al. |
| 5,196,297 A | 3/1993 | Dombrowski, Jr. et al. |
| 5,210,064 A | 5/1993 | Shon Baker et al. |
| 5,258,274 A | 11/1993 | Helland et al. |
| 5,284,816 A | 2/1994 | Stephenson |
| 5,350,870 A | 9/1994 | Boggs et al. |
| 5,401,619 A | 3/1995 | Boggs et al. |
| 5,450,099 A | 9/1995 | Stephenson et al. |
| 5,618,063 A | 4/1997 | Chang et al. |
| 5,644,352 A | 7/1997 | Chang et al. |
| 5,663,115 A | 9/1997 | Naito et al. |
| 5,686,159 A | 11/1997 | Langan |
| 5,699,100 A | 12/1997 | Fukuda et al. |
| 5,710,094 A | 1/1998 | Minami et al. |
| 5,712,890 A | 1/1998 | Spivey et al. |
| 5,729,274 A | 3/1998 | Sato |
| 5,796,420 A | 8/1998 | Kaerts et al. |
| 5,852,683 A | 12/1998 | Jewel |
| 5,876,898 A | 3/1999 | Ikeda et al. |
| 5,885,926 A | 3/1999 | Matsumoto |
| 5,916,680 A | 6/1999 | Wakata et al. |
| 6,076,915 A | 6/2000 | Gast et al. |
| 6,164,847 A | 12/2000 | Allen |
| 6,188,419 B1 | 2/2001 | Katamoto et al. |
| 6,197,725 B1 | 3/2001 | Ohkawa et al. |
| 6,269,177 B1 | 7/2001 | Dewaele et al. |
| 6,385,349 B1 | 5/2002 | Teo |
| 6,394,573 B1 | 5/2002 | Lapstun et al. |
| 6,459,094 B1 | 10/2002 | Wang et al. |
| 6,464,319 B1 | 10/2002 | Teshigawara et al. |
| 6,474,767 B1 | 11/2002 | Teshigawara et al. |
| 6,540,315 B1 | 4/2003 | Nystrom et al. |
| 6,561,613 B2 | 5/2003 | Cunnagin et al. |
| 6,631,012 B2 | 10/2003 | Athens et al. |
| 6,661,443 B2 | 12/2003 | Bybell et al. |
| 6,801,233 B2 | 10/2004 | Bhatt et al. |
| 6,832,825 B1 | 12/2004 | Nishikori et al. |
| 6,906,735 B2 | 6/2005 | Bhatt et al. |
| 6,951,952 B2 | 10/2005 | Cheon et al. |
| 7,008,759 B2 | 3/2006 | Cheon et al. |
| 7,132,203 B2 | 11/2006 | Pierrat |
| 7,176,161 B2 | 2/2007 | Chu et al. |
| 7,198,343 B2 | 4/2007 | Ebihara |
| 7,279,264 B2 | 10/2007 | Cheon et al. |
| 7,282,317 B2 | 10/2007 | Allen et al. |
| 7,298,387 B2 | 11/2007 | Busch et al. |
| 7,369,145 B2 | 5/2008 | Busch et al. |
| 7,379,082 B2 | 5/2008 | Jo et al. |
| 7,388,596 B2 | 6/2008 | Chung |
| 7,388,686 B2 | 6/2008 | Saquib et al. |
| 7,708,362 B2 | 5/2010 | Heiles et al. |
| 2001/0014229 A1 | 8/2001 | Nakata et al. |
| 2004/0085432 A1 | 5/2004 | Uratani et al. |
| 2004/0165054 A1 | 8/2004 | Saquib et al. |
| 2005/0007438 A1 | 1/2005 | Busch et al. |
| 2005/0137088 A1 | 6/2005 | Hayakawa et al. |
| 2005/0270317 A1 | 12/2005 | Gao et al. |
| 2006/0098038 A1 | 5/2006 | Im |
| 2006/0152573 A1 | 7/2006 | Busch et al. |
| 2006/0232642 A1 | 10/2006 | Busch et al. |
| 2006/0270552 A1 | 11/2006 | Bhatt et al. |
| 2006/0290769 A1 | 12/2006 | Liu et al. |
| 2006/0292502 A1 | 12/2006 | Busch et al. |
| 2006/0293185 A1 | 12/2006 | Filosa et al. |
| 2007/0225164 A1 | 9/2007 | Kajikawa et al. |
| 2007/0225166 A1 | 9/2007 | Koide et al. |
| 2007/0254992 A1 | 11/2007 | Callierotti et al. |
| 2009/0061124 A1 | 3/2009 | Koide et al. |
| 2009/0137389 A1 | 5/2009 | Choen et al. |

FOREIGN PATENT DOCUMENTS

| | | |
|---|---|---|
| EP | 0 774 857 A1 | 5/1997 |
| EP | 0 810 776 A2 | 12/1997 |
| EP | 1 091 560 A1 | 4/2001 |
| EP | 1 266 762 | 12/2002 |
| JP | 56002920 | 1/1981 |
| JP | 56-126192 | 10/1981 |
| JP | 63-102951 | 5/1988 |
| JP | 2002-301055 | 10/2002 |

OTHER PUBLICATIONS

Notice of Allowance in U.S. Appl. No. 11/159,880, Date of Mailing Jul. 22, 2010.
Notice of Allowance in U.S. Appl. No. 11/159,880, Date of Mailing Apr. 2, 2010.
International Preliminary Search Report for PCT/US2006/024033, issued on Dec. 24, 2007.
Notice of Allowance in U.S. Appl. No. 12/022,955, Date of Mailing Apr. 8, 2010.
International Search Report and Written Opinion—(PCT/US10/43638) Date of Mailing Nov. 16, 2010.
English Abstract of JP 57-116691, Publication Date: Jul. 20, 1982.
English Abstract of JP 59-001294, Publication Date: Jan. 6, 1984.
English Abstract of JP 05-008424, Publication Date: Jan. 19, 1993.
English translation of Unexamined Patent Application Publication (Kokai) (A) S59-194886; Publication Date: Nov. 5, 1984; JPO File No. 6906-2H; Patent Application No. S58-69700; Filing Date: Apr. 20, 1983; Applicant: Ricoh Corporation.
English translation of Japanese Laid-Open Publication No. 60-234881; Publication Date: Nov. 21, 1985; Application No. 59-91119; Filing Date: May 9, 1984; Applicant: Tomoegawa Paper Co., Ltd.
English translation of Japanese Laid-Open Publication No. 10-315635; Publication Date: Dec. 2, 1998; Application No. 9-128190; Filing Date: May 19, 1997; Applicant: Mitsubishi Paper Mills Ltd.
English translation of Japanese Laid-open Publication No. 56-126192; Publication date: Oct. 2, 1981; Application No. 55-29740; Filing date: Mar. 11, 1980; Applicant: Fujitsu Limited.
Abstract of Japanese Laid-Open Publication No. 2000-52653; Publication date: Feb. 22, 2000; Application No. 10-223434; Filing date: Aug. 6, 1998; Applicant: Nippon Kayaku Co Ltd.

PCT International Search Report—(PCT/US09/32470) Date of Mailing Mar. 23, 2009.
International Search Report—(PCT/US2006/024033) Date of Mailing Nov. 22, 2006.
Notice of Allowance in U.S. Appl. No. 11/397,251, Date of Mailing Aug. 4, 2009.
Examination Report for EP 06 773 640.5 dated Sep. 2, 2011.
Extended European Search Report for EP 11163056.2 Dtd Sep. 2, 2011.
Notice of Allowance for U.S. Appl. No. 12/873,796 dated Nov. 17, 2011.
Office Action for Chinese Patent Application No. 200680029953.4 dated Oct. 8, 2010 (English Translation).
Office Action on U.S. Appl. No. 11/159,880 Dtd Dec. 3, 2008.
Office Action on U.S. Appl. No. 11/397,251 Dtd Mar. 26, 2007.
Office Action on U.S. Appl. No. 11/397,251 Dtd Jun. 16, 2008.
Office Action on U.S. Appl. No. 11/397,251 Dtd Nov. 15, 2007.
US Notice of Allowance for U.S. Appl. No. 10/806,749 Dtd Jan. 9, 2006.
US Notice of Allowance on U.S. Appl. No. 10/374,847 Dtd Feb. 21, 2008.
US Notice of Allowance on U.S. Appl. No. 12/873,462 Dtd Sep. 1, 2011.
US Notice of Allowance on U.S. Appl. No. 12/940,845 Dtd Dec. 23, 2011.
US Office Action on U.S. Appl. No. 12/873,796 Dtd Sep. 28, 2011.

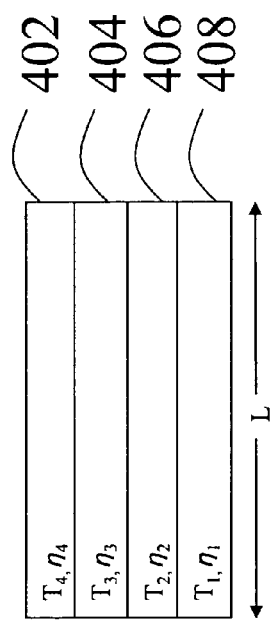
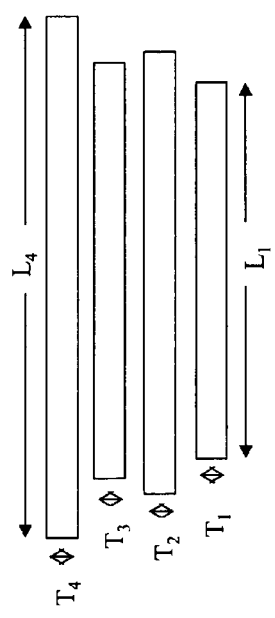
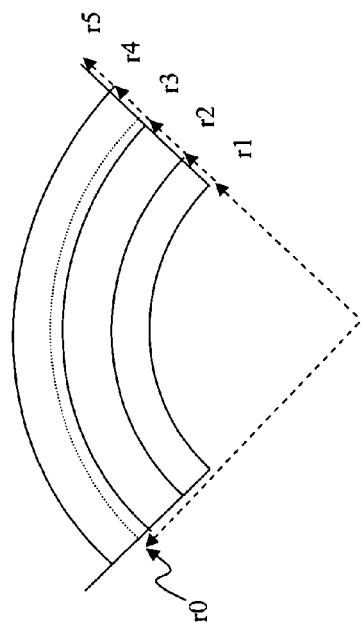
Fig. 4

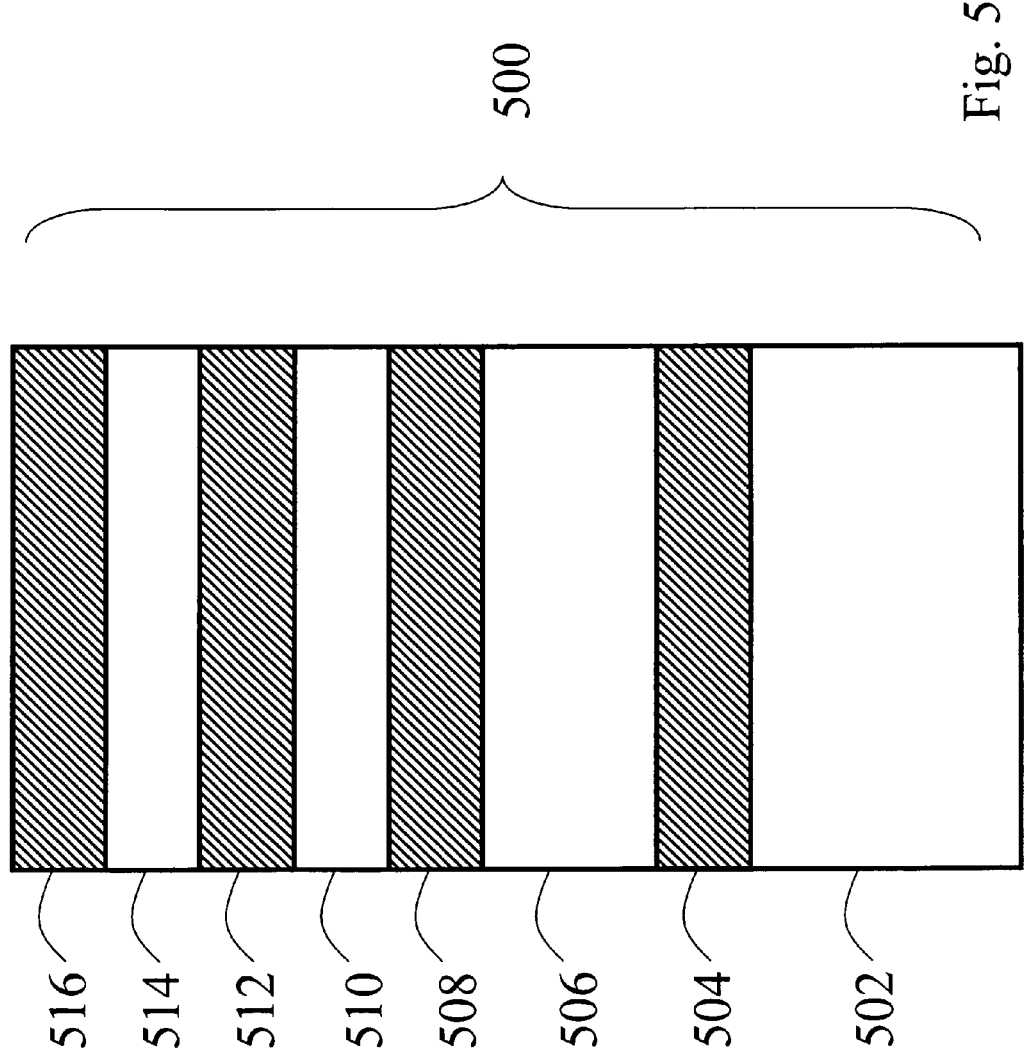

THERMALLY-INSULATING LAYERS AND DIRECT THERMAL IMAGING MEMBERS CONTAINING SAME

REFERENCE TO RELATED APPLICATIONS

This application is a continuation-in-part of U.S. patent application Ser. No. 11/397,251, filed on Apr. 3, 2006, now U.S. Pat. No. 7,635,660, entitled "Imaging System", which is a continuation of U.S. patent application Ser. No. 10/806,749, filed on Mar. 23, 2004 issued as U.S. Pat. No. 7,166,558 which is a divisional of U.S. patent application Ser. No. 10/151,432, filed on May 20, 2002, issued as U.S. Pat. No. 6,801,233, which claims the benefit of prior U.S. provisional patent application Ser. Nos. 60/294,486, filed on May 30, 2001, and 60/364,198, filed on Mar. 13, 2002 the disclosures all of which are hereby incorporated by reference herein in their entirety.

This application is related to the following commonly assigned United States patent applications and patents, the disclosures of all of which are hereby incorporated by reference herein in their entirety:

U.S. Pat. No. 7,008,759 B2 which describes and claims color-forming compositions for use in the present invention;

U.S. Pat. No. 7,176,161 B2 which describes and claims color-forming compositions for use in the present invention;

U.S. Pat. No. 7,282,317 B2 which describes and claims color-forming compositions for use in the present invention;

U.S. patent application Ser. No. 11/400,734, filed Apr. 6, 2006, which describes and claims an imaging method for use in the present invention;

U.S. Pat. No. 7,408,563, which describes and claims an imaging method for use in the present invention;

U.S. patent application Ser. No. 12/022,955, filed Jan. 30, 2008, entitled "Printhead pulsing techniques for multicolor printers";

U.S. patent application Ser. No. 12/022,969, filed Jan. 30, 2008, entitled "Thermal Imaging Members and Methods";

U.S. patent application Ser. No. 12/343,234, filed Dec. 23, 2008, entitled "Novel Color-forming Compounds and Use Thereof in Imaging Members and Methods"; and International patent application serial no. PCT/US2009/004436, filed on even date herewith, entitled "Optical Disc with Thermally-Printable Surface and Compression-Resistant Layer".

FIELD OF THE INVENTION

The present invention relates generally to thermal imaging and, more particularly, to thermally-insulating layers for controlling the rate of diffusion of heat within a multicolor thermal imaging member, and to imaging members comprising such thermally-insulating layers.

BACKGROUND OF THE INVENTION

Direct thermal imaging is a technique in which a substrate bearing at least one color-forming layer, which is typically initially colorless, is heated by contact with a thermal printing head to form an image. In direct thermal imaging there is no need for ink, toner, or thermal transfer ribbon. Rather, the chemistry required to form an image is present in the imaging member itself. Direct thermal imaging is commonly used to make black-and-white images, and is often employed for the printing of, for example, labels and purchase receipts. There have been described in the prior art numerous attempts to achieve multicolor direct thermal printing. A discussion of various color direct thermal imaging methods is provided in U.S. Pat. No. 6,801,233.

A preferred direct thermal imaging member described in the above-mentioned patent comprises three color-forming layers, each affording one of the subtractive primary colors, and is designed to be printed with a single thermal printing head. The topmost color-forming layer develops color in a relatively short period of time when the surface of the imaging member is heated to a relatively high temperature; the intermediate color-forming layer develops color in an intermediate length of time when the surface of the imaging member is heated to an intermediate temperature; and the lowest color-forming layer develops color in a relatively long period of time when the surface of the imaging member is heated to a relatively low temperature. Separating the color-forming layers are thermally-insulating layers whose thickness, thermal conductivity and heat capacity are selected so that temperatures reached within the color-forming layers may be controlled to provide the desired color by appropriate choices of heating conditions of the surface of the imaging member.

The composition of the thermally-insulating layers is ideally chosen so as neither to compromise the chemistry responsible for formation of color in the color-forming layers nor to degrade the stability of the final image.

Each color-forming layer typically comprises a dye precursor that is colorless in the crystalline form but colored in an amorphous form. Materials such as thermal solvents or developers may be incorporated into the color-forming layer to adjust the temperature at which color is formed or the degree of coloration that is achieved.

During heating of the thermal imaging member as it is printed to form an image, or during prolonged storage of the imaging member before or after an image is formed, it is possible that components initially incorporated within a color-forming layer may migrate from that layer into adjoining layers. Such migration of components may produce problems such as unwanted coloration in unprinted regions or changes in the activation temperature or degree of coloration of a color-forming layer, as is discussed in more detail below. It is also possible that materials in adjoining layers may migrate into a color-forming layer and degrade its performance.

In the prior state of the art it has been necessary to provide barrier layers to impede the migration of components from the color-forming layers into the thermally-insulating layers or from the thermally-insulating layers into the color-forming layers. Such additional barrier layers introduce complexity into the process for manufacturing the thermal imaging member, and may also contribute undesirable physical properties to the final article, as discussed in detail below. The need for additional barrier layers would be obviated by a thermally-insulating layer with improved properties, such that migration of components between the thermally-insulating layer and adjacent layers would be impeded or such that, if such migration were to occur, no objectionable consequence would result.

SUMMARY OF THE INVENTION

It is therefore an object of this invention to provide a multicolor thermal imaging member comprising at least two color-forming layers, separated by a thermally-insulating layer, that can be addressed with a thermal printing head to form an image.

Another object of the invention is to provide such a multicolor thermal imaging system wherein each color can be printed alone or in selectable proportion with the other color(s).

In one embodiment, a thermal imaging member includes (A) a substrate having first and second opposed surfaces; and (B) first and second color-forming layers carried by the first surface of the substrate. The first color-forming layer is closer to the first surface of the substrate than the second color-forming layer. The thermal imaging member also includes (C) a thermally-insulating layer between the first and second color-forming layers. The thermally-insulating layer includes at least 50% by weight of a polymeric latex material and at least 5% by weight of an organic material with a glass transition temperature of at least 80° C.

In another embodiment, a coating composition for the manufacture of a thermally-insulating layer includes at least 20% by weight of water-borne latex polymeric material and less than 20% by weight of a hydrophobically-modified poly(vinyl alcohol). The viscosity of the coating composition measured at 1000 s$^{-1}$ is more than 50 mPa·s and the flow behavior index n is in the range 0.8-1.

BRIEF DESCRIPTION OF THE DRAWINGS

FIG. 4 is a partially schematic, side sectional view of an embodiment of a laminar structure as it is distorted by dimensional changes of its constituent layers; and FIG. 5 is a partially schematic, side sectional view of a preferred embodiment of a multicolor thermal imaging member.

DETAILED DESCRIPTION OF THE INVENTION

The structure and method of printing of thermal imaging members of the present invention will now be discussed in sufficient detail that the role of the thermally-insulating layers may be understood and the requirements for their properties fully appreciated.

Figure 1:
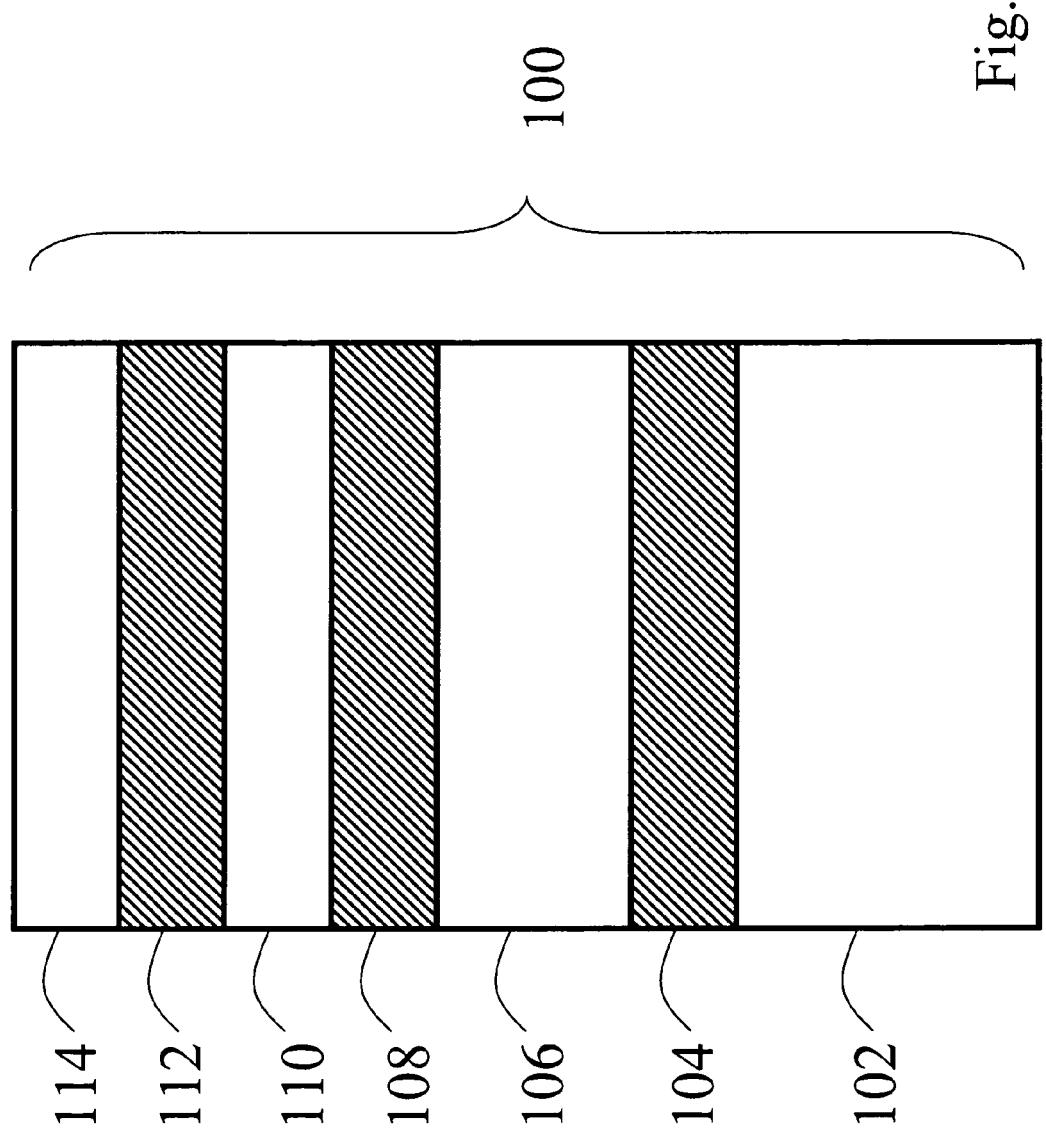
FIG. 1 is a partially schematic, side sectional view of an embodiment of a multicolor thermal imaging member.

Referring now to FIG. 1, there is seen a thermal imaging member 100 that includes a substrate 102, that can be transparent, absorptive, or reflective, and three color-forming layers 104, 108, and 112, that when heated produce cyan, magenta and yellow coloration, respectively; thermally-insulating layers 106 and 110; and an overcoat layer 114 that protects the surface of the imaging member and provides lubrication during the printing process.

Each color-forming layer can change color, e.g., from initially colorless to colored, where it is heated to a particular temperature referred to herein as its activating temperature.

Any order of the colors of the color-forming layers can be chosen. One preferred color order is as described above. Another preferred order is one in which the three color-forming layers 104, 108, and 112 provide yellow, magenta and cyan, respectively.

All the layers disposed on the substrate 102 are substantially transparent before color formation. When the substrate 102 is reflective (e.g., white), the colored image formed on imaging member 100 is viewed through the overcoat 114 against the reflecting background provided by the substrate 102. The transparency of the layers disposed on the substrate ensures that combinations of the colors printed in each of the color-forming layers may be viewed.

In the preferred embodiments of the invention where the thermal imaging member includes at least three color-forming layers, all the color-forming layers may be arranged on the same side of a substrate, or two or more of the color-forming layers may be arranged on one side of a substrate with one or more color-forming layers being arranged on the opposite side of the substrate.

The color-forming layers are addressed at least partially independently by variation of two adjustable parameters, namely, the temperature at the surface of the thermal imaging member and the time or duration of heating at that temperature. These parameters can be controlled by adjusting the magnitude and duration of the supply of electrical power to the resistive heating elements of a thermal printing head that is in thermal contact with the imaging member 100, as discussed in detail in U.S. patent application Ser. No. 12/022,955. In this way, each color of the multicolor imaging member can be printed alone or in selectable proportion with the other colors.

Depending upon the printing time, available printing power, and other factors, various degrees of independence in the addressing of the color-forming layers can be achieved. The term "independently" is used to refer to instances in which the printing of one color-forming layer typically results in a very small, but not generally visible change of optical density (e.g., density <0.05) in the other color-forming layer(s). In the same manner, the term "substantially independent" color printing is used to refer to instances in which inadvertent or unintentional change in coloration of another color-forming layer or layers results in a visible density change which is at a level typical of interimage coloration in multicolor photography (e.g., density <0.2). The term "partially independent" addressing of the color-forming layers is used to refer to instances in which the printing of maximum density in the layer being addressed results in a coloration change of another color-forming layer or layers in a density amount higher than 0.2 but not higher than 1.0. The phrase "at least partially independently" is inclusive of all of the degrees of independence described above.

The color-forming layers of the thermal imaging member undergo a change in color to provide the desired image in the imaging member. The change in color may be from colorless to colored, from colored to colorless, or from one color to another. The term "color-forming layer" as used throughout the application, including in the claims, includes all such embodiments. In the case where the change in color is from colorless to colored, an image having different levels of optical density (i.e., different "gray levels") of that color may be obtained by varying the amount of color in each pixel of the image from a minimum density, Dmin, which is substantially colorless, to a maximum density, Dmax, in which the maximum amount of color is formed. In the case where the change in color is from colored to colorless, different levels are obtained by reducing the amount of color in a given pixel from Dmax to Dmin, where ideally Dmin is substantially colorless.

According to a preferred embodiment of the invention, each of the color-forming layers 104, 108 and 112 is independently addressed by application of heat with a thermal printing head in contact with a single surface, such as the topmost layer of the member, optional overcoat layer 114 in the member illustrated in FIG. 1. The activating temperature (Ta3) of the third color-forming layer 112 (as counted from the substrate 102, i.e., the color-forming layer closest to the surface of the thermal imaging member) is greater than the activating temperature (Ta2) of the second color-forming layer 108, which in turn is greater than the activating temperature (Ta1) of the first color-forming layer 104. Delays in heating and subsequent cooling of color-forming layers at greater distances from the thermal printing head are provided by the time required for heat to diffuse through the thermally-insulating layers 106 and 110. The lower temperature of layers below the thermally-insulating layers permits the color-forming layers closer to the thermal printing head to be heated to above their activating temperatures without activating the color-forming layer (or layers) further from the thermal printing head, even though the activating temperatures of the color-forming layers closer to the thermal printing head can be substantially higher than the activating temperatures of the color-forming layers that are further away from the thermal printing head. Thus, when addressing the uppermost color-forming layer 112 the thermal printing head is heated to a relatively high temperature, but for a short time, such that insufficient heat is transferred to the other color-forming layers of the imaging member to provide image information to either of color-forming layers 108 and 104. The combination of thickness and thermal diffusivity of thermally-insulating layers 106 and 110 is chosen so as to satisfy this requirement, as discussed in more detail below.

The heating of the lower color-forming layers, i.e., those closer to the substrate 102 (in this case color-forming layers 108 and 104), is accomplished by maintaining the thermal printing head at temperatures such that the upper color-forming layer(s) remain below their activating temperatures for sufficient periods of time to allow heat to diffuse through them to reach the lower color-forming layer(s). In this way, coloration of the upper color-forming layer(s) is avoided when the lower color-forming layer(s) are being imaged.

Thermal printing heads used in the method of the present invention typically include a substantially linear array of resistors that extends across the entire width of the image to be printed.

The imaging member is typically imaged while being transported in a direction perpendicular to the line of resistors on the printing head while pulses of heat are provided by supplying electrical current to these resistors. The time period during which heat can be applied to thermal imaging member 10 by a thermal printing head is typically in the range of about 0.001 to about 100 milliseconds per line of the image. The lower limit may be defined by the constraints of the electronic circuitry or by the thermal response time of the system comprising the thermal imaging member and thermal printing head, while the upper limit is set by the need to print an image in a reasonable length of time. The spacing of the dots that make up the image is generally in the range of 100-600 per inch in directions both parallel and transverse to the direction of motion, and is not necessarily the same in each of these directions.

The heating of the color-forming layers according to the invention may be accomplished by a single printing head in a single pass, or by more than one pass of a single thermal printing head, or by a single pass of each of more than one thermal printing head, as is described in detail in U.S. Pat. No. 7,408,563.

Although the heating of imaging member 100 is preferably carried out using a thermal printing head, any method providing controlled heating of the thermal imaging member may be used in the practice of the present invention. For example, a modulated source of light (such as a laser) may be used. In this case, as is well known in the art, an absorber for light of a wavelength emitted by the laser must be provided in the thermal imaging member or in contact with the surface of the imaging member.

When a thermal printing head (or other contact heating element) is used to heat the thermal imaging member 100, heat diffuses into the bulk of the thermal imaging member from the layer in contact with the thermal printing head (typically, overcoat layer 114). When a source of light is used for heating, the layer or layers containing an absorber for the light will be heated as light is converted to heat in these layers, and heat will diffuse from these layers throughout the thermal imaging member. It is not necessary that the light-absorbing layers be at the surface of the imaging member, provided that the layers of the thermal imaging member separating the source of light from the absorbing layers are transparent to light of the wavelength to be absorbed. In the discussion below it is assumed that the layer that is directly heated is the overcoat layer 114, and that heat diffuses from this layer into the thermal imaging member, but similar arguments apply whichever layer or layers of the thermal imaging member 10 is (or are) heated.

Figure 2:
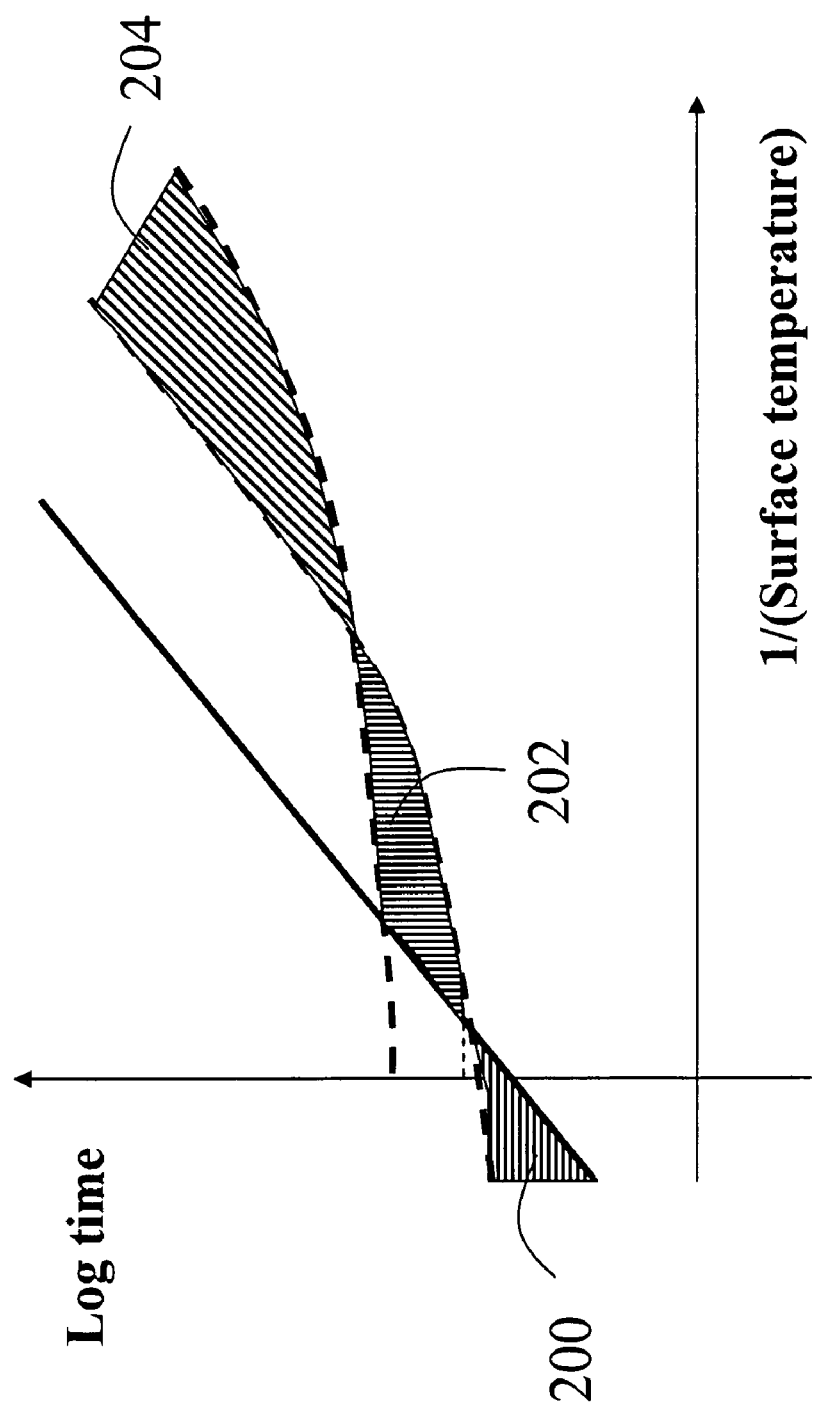
FIG. 2 is a graphical illustration showing the relative times and temperatures of heating required to address the separate colors of an embodiment of a multicolor thermal imaging member.

FIG. 2 is a graphical illustration showing the thermal printing head temperatures and times of heating required to address color-forming layers 104, 108 and 112, assuming that these layers are all initially at ambient temperature. The axes of the graph in FIG. 2 show the logarithm of the heating time and the reciprocal of the absolute temperature at the surface of the imaging member 100 that is in contact with the thermal printing head. Region 200 (relatively high printing head temperature and relatively short heating time) provides imaging of color-forming layer 112, region 202 (intermediate printing head temperature and intermediate heating time) provides imaging of color-forming layer 108 and region 204 (relatively low printing head temperature and relatively long heating time) provides imaging of color-forming layer 104. The time required for imaging color-forming layer 104 is substantially longer than the time required for imaging color-forming layer 112.

The activating temperatures selected for the color-forming layers are generally in the range of about 90° C. to about 300° C. The activating temperature (Ta1) of the first color-forming layer 104 is preferably as low as possible consistent with thermal stability of the imaging member during shipment and storage and preferably is about 90° C. or more. The activating temperature (Ta3) of the third color-forming layer 112 is preferably as low as possible consistent with allowing the activation of the second and third color-forming layers 108 and 104 by heating through this layer without activating it according to the method of the invention, and preferably is about 200° C. or more. The activating temperature (Ta2) of the second color-forming layer 108 is between Ta1 and Ta3 and is preferably between about 140° C. and about 180° C.

In one embodiment of the present invention, the color-forming layers comprise a material that is colorless in the crystalline form and colored in an amorphous form (hereinafter referred to as a "crystalline color-forming material") as described in detail in U.S. Pat. No. 7,176,161. The third color-forming layer 112 preferably comprises no other fusible material except the crystalline color-forming material, since it is important that in this layer the activation temperature be as independent of the heating time as possible, as described in the abovementioned U.S. Pat. No. 7,176,161.

One or more thermal solvents, which are crystalline, fusible materials, are incorporated into the first and second color-forming layers in certain preferred embodiments of the thermal imaging member. The crystalline thermal solvent(s), upon being heated, melt and thereafter dissolve or liquefy the crystalline color-forming material, thereby converting it to an amorphous form and providing a color change (i.e., an image). Thermal solvents may be advantageously used when it is required for a color-forming layer to have an activation temperature that is lower than the melting point of the crystalline color-forming material itself. The melting point of the thermal solvent, rather than that of the crystalline color-forming material, may in such a case establish the activation temperature of the color-forming layer.

It will be clear to one of ordinary skill in the art that the activation temperature of a color-forming layer that comprises a mixture of crystalline materials may be different from the melting points of any of the individual components. A eutectic mixture of two crystalline components, for example, melts at a lower temperature than either of the components in isolation. Conversely, if the rate of solubilization of the crystalline color-forming material in the molten thermal solvent is slow, the activation temperature of the mixture may be higher than the melting point of the thermal solvent. Recall that the activation temperature of a mixture of a crystalline color-forming material and a thermal solvent is the temperature at which the color of the mixture changes, i.e., the temperature at which a sufficient amount of the crystalline color-forming material dissolves in the molten thermal solvent to provide a visible color change. It will be clear from the above discussion that the activation temperature of a mixture of a crystalline color-forming material and a thermal solvent or solvents may be dependent upon the rate of heating. In the design of thermal imaging members of the present invention, therefore, determination of the actual activation temperature of a composition is preferred to be carried out experimentally.

Any suitable thermal solvent may be incorporated into the color-forming layers of the thermal imaging members of the invention. Suitable thermal solvents include, for example, aromatic and aliphatic ethers, diethers and polyethers, alkanols containing at least about 12 carbon atoms, alkanediols containing at least about 12 carbon atoms, monocarboxylic acids containing at least about 12 carbon atoms, esters and amides of such acids, aryl amides, especially benzanilides, aryl sulfonamides and hydroxyalkyl-substituted arenes.

Specific preferred thermal solvents include: 1,2-diphenoxyethane, 1,2-bis(4-methylphenoxy)ethane, tetradecan-1-ol, hexadecan-1-ol, octadecan-1-ol, dodecane-1,2-diol, hexadecane-1,16-diol, myristic acid, palmitic acid, stearic acid, methyl docosanoate, 1,4-bis(hydroxymethyl)benzene, diaryl sulfones such as diphenylsulfone, 4,4'-dimethyldiphenylsulfone, phenyl p-tolylsulfone and 4,4'-dichlorodiphenylsulfone, and p-toluenesulfonamide.

Particularly preferred thermal solvents are ethers such as 1,2-bis(2,4-dimethylphenoxy)ethane, 1,4-bis(4-methylphenoxymethyl)benzene, bis(4-phenoxyphenoxymethyl)benzene and 1,4-bis(benzyloxy)benzene.

It is possible that the dissolution of the crystalline color-forming material by a thermal solvent may lead to an amorphous form in which the amount of color that is formed is different from the amount that would be present in an amorphous form resulting from melting the crystalline color-forming material alone (i.e., without interaction with the thermal solvent). Typically, the crystalline color-forming materials of the present invention are tautomeric compounds in which at least one tautomer is colorless and at least another tautomer is colored. The crystalline form comprises substantially the colorless tautomer, whereas the colored form comprises both tautomers in proportions that depend upon the structure of the particular color-forming material and the environment in which it is located. The proportion of the colored tautomer in the amorphous material may be enhanced by use of hydrogen-bonding or acidic adjuvants. It is possible that such materials may actually protonate the color-forming material to produce a new, colored compound. Materials that increase the proportion of the color-forming material that is in a colored form are hereinafter referred to as "developers". It is possible that the same compound may serve the function of thermal solvent and developer. Preferred developers include phenols such as 4,4'-butylidenebis[2-(1,1-dimethylethyl)-5-methyl-phenol], 2,2'-methylenebis(6-tert-butyl-4-methylphenol), 2,2'-methylenebis(6-tert-butyl-4-ethylphenol), 2,2'-ethylidenebis(4,6-di-tert-butylphenol), bis[2-hydroxy-5-methyl-3-(1-methylcyclohexyl)phenyl]methane, 1,3,5-tris(2,6-dimethyl-3-hydroxy-4-tert-butylbenzyl)isocyanurate, 2,6-bis[[3-(1,1-dimethylethyl)-2-hydroxy-5-methylphenyl]methyl]-4-methylphenol, 2,2'-butylidenebis[6-(1,1-dimethylethyl)-4-methylphenol, 2,2'-(3,5,5-trimethylhexylidene)bis[4,6-dimethyl-phenol], 2,2'-methylenebis[4,6-bis(1,1-dimethylethyl)-phenol, 2,2'-methylpropylidene)bis[4,6-dimethyl-phenol], 1,1,3-tris(2-methyl-4-hydroxy-5-t-butylphenyl)butane, tris(3,5-di-t-butyl-4-hydroxybenzyl)isocyanurate, 2,2'-thiobis(4-tert-octylphenol), and 3-tert-butyl-4-hydroxy-5-methylphenyl sulfide.

In order for the image formed by the amorphous color-former to be stable against recrystallization back to the crystalline form, preferably the glass transition temperature (Tg) of the amorphous mixture of the color-former and any thermal solvent and/or developer should be higher than any temperature that the final image must survive. Typically, it is preferred that the Tg of the amorphous, colored material be at least about 50° C., and ideally above about 60° C. In order to ensure that the Tg is sufficiently high for a stable image to be formed, additional materials having a high Tg may be added to the color-forming composition. Such materials, hereinafter referred to as "stabilizers", when dissolved in the amorphous mixture of color-former, optional thermal solvent, and optional developer, serve to increase the thermal stability of the image.

Preferred stabilizers have a Tg that is at least about 60° C., and preferably above about 80° C. Examples of such stabilizers are the aforementioned 1,3,5-tris(2,6-dimethyl-3-hydroxy-4-tert-butylbenzyl) isocyanurate (Tg 123° C.) and 1,1,3-tris(2-methyl-4-hydroxy-5-t-butylphenyl)butane (Tg 101° C.). The stabilizer molecule may also serve as a thermal solvent or as a developer.

For example, the color-forming material may itself have a melting temperature above the desired temperature for imaging, and a Tg (in the amorphous form) of about 60° C. In order to produce a color-forming composition melting at the desired temperature, it may be combined with a thermal solvent that melts at the desired temperature for imaging. The combination of thermal solvent and color-forming material may, however, have a Tg that is substantially lower than 60° C., rendering the (amorphous) image unstable. In this case, a stabilizer such as 1,3,5-tris(2,6-dimethyl-3-hydroxy-4-tert-butylbenzyl) isocyanurate may be added, to raise the Tg of the amorphous material. In addition, there may be provided a developer, for example, a phenolic compound such as 2,2'-ethylidenebis(4,6-di-tert-butylphenol), in order to increase the proportion of the color-forming material that is in the colored form in the amorphous phase.

Preferably the color-forming compound of the present invention, the (optional) thermal solvent, the (optional) developer and the (optional) stabilizer are each predominantly in their crystalline forms prior to imaging. By "predominantly" is meant at least about 50% and preferably more than that. During imaging, at least one of these materials melts and an amorphous mixture of the materials is formed. As noted above, the amorphous mixture is colored, whereas the crystalline starting materials are colorless.

The temperature range over which melting (and therefore coloration) occurs should be as narrow as possible, especially in the case that the crystalline color-forming compounds are incorporated into a thermal imaging member capable of forming full-color images. It is preferred that the temperature range of melting (as measured by differential scanning calorimetry) of a color-forming composition comprising a crystalline color-forming compound be less than 15° C. as measured at the half height of the peak, and preferably less than 10° C. measured at half height.

It is possible that one of the components in the amorphous, colored mixture may recrystallize after the image has been formed. It is desirable that such recrystallization not change the color of the image. In the case that a color-former, thermal solvent, developer and stabilizer are used, the thermal solvent may typically recrystallize without greatly affecting the color of the image.

Color-forming layers may comprise any of the image-forming materials described above, or any other thermally-activated colorants, and are typically from about 0.5 to about 4.0 μm in thickness. Color-forming layers may also comprise more than one layer (hereinafter referred to as "sub-layers"), which may not have identical composition. For example, a crystalline color-forming material may be incorporated into one sub-layer while a thermal solvent may be located in another. Other arrangements, including sub-layers for control of the rates of chemical diffusion, will occur to those of ordinary skill in the art. In such cases each of the constituent sub-layers is typically from about 0.1 to about 3.0 μm in thickness.

Color-forming layers may comprise dispersions of solid materials, encapsulated liquid, amorphous or solid materials or solutions of active materials in polymeric binders, or any combinations of the above.

Preferred binder materials for use in color-forming layers include water-soluble polymers such as poly(vinyl alcohol), ethylene vinyl alcohol polymers, polyacrylamide, gelatin, cellulosic materials, and salts of carboxylated polymers (for example, ammonium salts of polymers containing acrylic acid units). One disadvantage of the use of such water-soluble polymers, however, is that they may be prone to hydration (and therefore swelling) in humid environments, and conversely dehydration in dry environments. Changes in hydration typically change the physical and chemical properties of the binder material. For example, dehydrated poly(vinyl alcohol) may have a Tg of about 75° C., whereas the hydrated material may have a Tg of 20° C. or less. Such gross changes in properties may affect the mixing of components during imaging and therefore the activation temperature of the color-forming layer.

In addition, the dimensional changes that occur during hydration and dehydration, coupled with the change in Tg, may lead to physical distortions of the thermal imaging member, such as curling, as discussed in more detail below.

For this reason, it is preferred that the binder for the color-forming layers comprise a material that is water-dispersed (to allow it to be coated by conventional coating methods) but that, after drying, is not susceptible to rehydration. Many water-borne latex materials exhibit this desired property. Preferred latex binders for use in the present invention have a Tg as high as possible, consistent with a coalescence temperature that can be attained during drying of the coating without activation of the color-forming chemistry. A preferred Tg is at least about 25° C. In addition, it is preferred that the latex binder have a pH between about 6 and about 8. Materials falling outside this range may affect the tautomeric equilibrium of the color-forming materials. Finally, it is preferred that the latex binder be free of small molecules such as surfactants or cosolvents, since these materials also may affect the color-forming chemistry. A preferred water-borne latex binder for use in the present invention is styrene-butadiene rubber CP-655, available from Dow Chemical Co., Midland, Mich.

For certain applications of the present invention it is required that the thermal imaging member remain flat when subjected to changes in temperature and/or humidity. For example, the perceived quality of a photographic image is markedly reduced if the image is curled, particularly if the imaging member curls towards the printed side. As is well known in the art, curl that is induced by changes in temperature or humidity may be corrected by the application of a balancing layer to the opposite side of the substrate. Such a balancing layer is designed to exhibit similar dimensional changes to the layers applied to the image side of the substrate under all environmental conditions to which the imaging member is likely to be subjected. In certain labeling applications, however, such a solution may not provide a practicable solution, especially when the curling is caused by changes in humidity.

Figure 3:
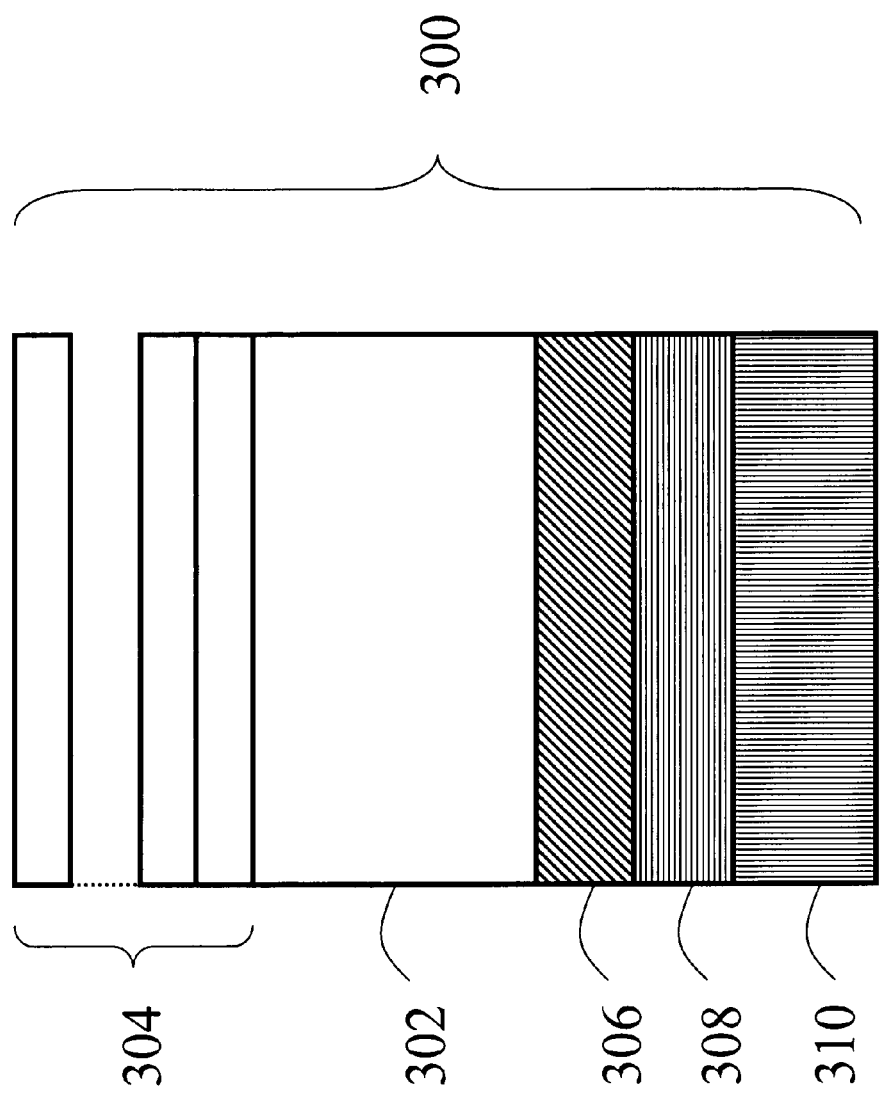
FIG. 3 is a partially schematic, side sectional view of an embodiment of a multicolor thermal imaging member.

Referring now to FIG. 3, there is seen a thermal imaging member of the present invention that is intended to produce a printed label. Substrate 302 is coated on one side with all the layers required to form an image (represented by layers 304). Layer 304 may, for example, comprise all the layers 104-114 shown in FIG. 1. On the opposite side of the substrate 302 are an optional curl-balancing layer 306, an adhesive layer 308 and a removable liner 310. For the curl-balancing layer 306 to be effective in correcting curl induced by dimensional changes in layers 304 that are caused by changes in environmental humidity, adhesive layer 308 and liner 310 must be permeable to water vapor. In practice, it may be difficult to achieve sufficient water permeability of these layers such that equilibration of layer 306 to changing humidity is not substantially slower than equilibration of layers 304. In addition, in normal use the label liner 310 is removed and adhesive layer 308 is used to stick the label to a surface. If the surface and the substrate 302 are impermeable to water there is no way that curl-balancing layer 306 can equilibrate to the environment. It is then possible that the curl forces caused by dimensional change of layers 304 may overwhelm the strength of the adhesive bond between the label and the surface, causing the label to peel off the surface.

In one preferred application, disclosed in copending International patent application serial no. PCT/US2009/004436, entitled "Optical Disc with Thermally-Printable Surface and Compression-Resistant Layer", filed on even date herewith, the label is applied to the surface of an optical disc. In one embodiment the label is adhered to the disc prior to printing. In such a case a curl-balancing layer such as layer 308 cannot be effective, since it is located on the same side of the neutral axis for bending of the labeled disc as the imaging layers 304. In such a case it becomes necessary to design the imaging layers 304 such that they do not exert a substantial curl force when subjected to changing temperature and/or humidity.

As disclosed in copending International patent application serial no. PCT/2009/004436, filed on even date herewith, entitled "Optical Disc with Thermally—Pintable Surface and Compression-Resistant Layer" a label for an optical disc may comprise a thermal imaging member similar to member 100 shown in FIG. 1 in which substrate 102 is polycarbonate. When the thickness of such a polycarbonate substrate 102 is 50 microns, it is preferred that the curvature induced by changes in temperature and/or humidity in thermal imaging member 100 be less than 120 m$^{-1}$. If this criterion is not met, it is likely that the label will exert sufficient curl force to warp an optical disc to which it is affixed, so that the data stored in the disc will not be reliably written to or read back by a laser addressing the face of the disc opposite to that bearing the label. This problem is discussed in detail in the aforementioned copending International patent application serial no. PCT/2009/004436 filed on even date herewith. As is shown in that patent application, the maximum tolerable coverage of a layer of fully-hydrolyzed poly(vinyl alcohol) coated onto a polycarbonate base of 62.5 microns thickness is 3 g/m$^2$ if the disc warp criterion is to be met.

A discussion of the mechanism of curl induced by changes in humidity will now be given in more detail. As is known in the art, during drying from a fully hydrated state a layer comprising a water-swellable polymer such as poly(vinyl alcohol) will exhibit shrinkage due to loss of water. Such shrinkage may not cause curling of the substrate onto which the layer is coated so long as sufficient water is retained that viscous flow within the water-swellable polymer layer is possible. As further water is lost, however, elastic behavior (i.e., energy storage) may start to dominate viscous flow and a curl force, caused by shrinkage due to the loss of water, may be experienced by the substrate, provided that the adhesion between the polymer layer and the substrate is sufficiently strong that slippage does not occur at this interface. If slippage does occur, the polymer layer will be observed to have shrunk relative to the substrate. In the case that the polymer is poly(vinyl alcohol), measurements of weakly-adhered coatings have indicated that the amount of shrinkage is about 2.5% in each direction parallel to the surface of the substrate when a fully hydrated coating is placed in an (dry) atmosphere of 5-10% relative humidity (RH).

It is possible to estimate the amount of curl that a laminar structure will exhibit when its constituent layers change in volume, provided that the thickness and Young's modulus of each layer is known. Referring now to FIG. 4(*a*) there is seen a laminar structure composed of four layers, 402-408, with thicknesses $T_1, T_2 \ldots T_4$ and Young's modulus values of $\eta_1, \eta_2 \ldots \eta_4$. FIG. 4(*b*) shows the situation in which the four layers have undergone a dimensional change, such that each layer is now of a different length. Such a situation may pertain, for example, in a thermal imaging member comprising four layers each of which contains a different proportion of a water-swellable polymer. In FIG. 4(*b*) the dimensional change of each layer is shown as it would be were the layers not adhered together. In the thermal imaging members of the present invention, however, the adhesive bonding between layers is strong enough that the situation shown in FIG. 4(*c*) obtains, in which the entire structure is warped into a curvature that may be predicted from the degree of dimensional change of each layer, its starting thickness, and its Young's modulus using equation (1):

$$\frac{1}{r_1} \approx \frac{12 \sum_{n=1}^{N} \sum_{m=1}^{N} \alpha_n \alpha_m \left( \frac{L_n - L_m}{L_0} \right)(S_n - S_m)}{\sum_{n=1}^{N} \sum_{m=1}^{N} \alpha_n \alpha_m (T_m^2 + T_n^2 + 12(S_n - S_m)^2)} \quad (1)$$

where $$S_n \equiv \sum_{j=1}^{n-1} T_j + \frac{T_n}{2} \text{ and } \alpha_n \equiv \frac{\eta_n T_n}{L_n}$$

As noted above, the amount of shrinkage typically observed for poly(vinyl alcohol) layers upon dehydration from a fully hydrated state is about 2.5%. The Young's modulus of the dehydrated polymer is in the range of 1 GPa (to the nearest order of magnitude). When a layer comprises crystalline organic materials (having Young's modulus estimated in the range of 10 GPa) in a poly(vinyl alcohol) binder, the shrinkage of the layer is reduced (because the crystalline materials do not tend to swell upon hydration) but the Young's modulus of the composite is higher than that of the pure polymer. The present inventors have found that these two factors approximately cancel out, and the curl force exerted by such a layer is roughly the same as would be exerted by a layer of the pure polymer.

Those of ordinary skill in the art will be aware that the grade of poly(vinyl alcohol) affects the degree of curl seen upon dehydration. In general the curl force exerted upon dehydration is lower when the molecular weight or the degree of hydrolysis of the polymer is lower.

The present inventors have found that when it is necessary to introduce a water-swellable polymer such as poly(vinyl alcohol) it is preferable to do so as a component in a layer that also contains a material that does not swell upon hydration and that has a relatively low Young's modulus. Note that the values of Young's modulus given above are approximate values that are cited for the purpose of illustration only, and should not be taken to limit the scope of the present invention in any way.

The structure and mechanism of color formation in the thermal imaging member having been described, the requirements of the thermally-insulating layers 106 and 110 will now be discussed in more detail.

As noted above, the principal purpose of the thermally-insulating layers is to protect underlying color-forming layers from reaching their activation temperatures when overlying color-forming layers are exposed to heat. Preferably, the thermal insulation is achieved with the thinnest possible thermally-insulating layer.

There are several reasons why thin thermally-insulating layers are preferred. Thicker thermally-insulating layers may be more difficult to manufacture than thinner layers and may introduce physical problems such as a propensity to curl, as discussed above. Also, the image formed in color-forming layer 112, for example, must be viewed through both thermally-insulating layers 106 and 110. Any scattering of light within the thermally-insulating layers will decrease the effective optical density of the image in the color-forming layers below the thermally-insulating layers. The transparency requirement of the material from which the thermally-insulating layer is made becomes more stringent, therefore, as a thermally-insulating layer becomes thicker.

Yet another requirement of a thermally-insulating layer is that it must have sufficient dimensional stability that the layer is not physically disrupted (for example, "plowed" by the thermal printing head) during printing, during which the thermally-insulating layer may be heated to a high temperature. Such a physical disruption could cause unwanted visible marring of the printed image. As discussed below, thermally-insulating layers are typically composed of relatively soft materials. Relatively thinner thermally-insulating layers may be less prone to physical disruption during printing than relatively thicker thermally-insulating layers.

In order to make the thermally-insulating layer as thin as possible, its composition preferably has the highest possible specific heat capacity and the lowest possible thermal conductivity, for a given density.

Typical preferred values for the specific heat capacity of the thermally-insulating layer are 1500 J/kg.K or greater (as measured at 25° C.). Typical preferred values for the thermal conductivity of the thermally-insulating layer are 0.2 W/m.K or less (as measured at 25° C.).

Using materials with these thermal properties, having densities in the range of 1-1.5 g/cm$^3$, thermally-insulating layer 106 of imaging members of the present invention typically has a coverage of 6-30 g/m$^2$ in imaging members of the present invention, while the coverage of thermally-insulating layer 110 is typically at least 3 times thinner, in the range of about 1-5 g/m$^2$.

In general, the square of the thickness of thermally-insulating layer 110 divided by its thermal diffusivity (a quantity that relates to the time required for heat to diffuse through the layer) should be at least four times greater than the square of the thickness of thermally-insulating layer 106 divided by its thermal diffusivity.

It is preferred that the thermally-insulating layers be deposited by aqueous coating processes in the manufacture of the thermal imaging members of the present invention. It will be apparent to those of ordinary skill in the coating art that the production of layers with such a relatively high dried coverage requires the use of concentrated aqueous coating fluids if problems with drying of the wet coating are to be avoided. Fluid concentrations of at least about 20% solids by weight, and preferably 30% solids or more by weight are preferred.

Yet another desired property of the thermally-insulating layer is waterfastness of the dried coating, especially if the image is intended for outdoor use.

The present inventors have found that certain water-borne latex materials best meet the combination of required properties discussed above, namely, high heat capacity, low thermal conductivity and waterfastness of the dried material, together with the property of being coatable onto a substrate from an aqueous coating fluid having a solid content in the range of 20-50% by weight.

Generally, the use of dispersions of inorganic particles, for example, silica, insoluble metal oxides or insoluble metal salts, is less preferred, since such materials, although available as concentrated aqueous dispersions, typically exhibit lower specific heat capacity and higher thermal conductivity than dispersions of organic amorphous polymers. It may, however, be advantageous to incorporate dispersed inorganic particles into the composition of the thermally-insulating layer in order, for example, to strengthen the composition or to provide chemical or gas barrier properties. Clay materials such as Laponite, Montmorillonite, Bentonite and Hectorite, for example, are particularly useful in this regard.

When mixtures of components are used to make up the thermally-insulating layer, it is preferred that their refractive indices be as closely matched as possible, or that their particle size be sufficiently small that light scattering is minimized and the greatest possible transmission of light achieved.

It is important that water-borne latex materials for use in the thermally-insulating layers of the present invention have a glass transition temperature, Tg, in an appropriate range. Materials with too high a Tg may fail to form a cohesive film when dried. On the other hand, a number of problems are encountered when materials with too low a Tg are used. Firstly, such materials tend to flow when heated at temperatures that are attained during thermal printing, and this can lead to disruption of the printed image. Secondly, the rates of diffusion of small molecules in amorphous materials (such as the latex polymers) are much higher above the glass transition temperature than below it. Diffusion of small molecules from the color-forming layers into the thermally-insulating layers may lead to significant problems with the stability of the printed image, or of the thermal imaging member prior to printing. A particular problem that is commonly encountered is diffusion of the color-forming material itself into the thermally-insulating layer. When this occurs, it is possible that unintended coloration of the color-forming material may be seen.

This is particularly a problem in areas of a picture that are intended to be white (i.e., Dmin, the optical density in white regions of the image, may be higher than is desired). It is an object of the present invention to provide a composition for a thermally-insulating layer in which minimal increase of Dmin is observed during storage of the thermal imaging member either before or after printing.

Preferred water-borne latex materials for use in the thermally-insulating layers of the present invention have a Tg in the range of about 15-35° C. The highest possible Tg consistent with film formation and coalescence of the latex during drying of the coating is desired. Typically, the maximum temperature used during drying of the thermally-sensitive coatings is about 70° C. Preferred minimum film-forming temperatures are in the range of 20-60° C.

As is well known in the art, core-shell latex materials are known in which a core of high Tg is encapsulated by a shell of lower Tg material. Coalescence of the film is achieved by flow of the shell material, maintaining a higher average Tg in a cohesive film than would be achievable otherwise. Such materials may be used in the practice of the present invention, in which case the material that comprises the shell of the particle should meet the Tg requirements outlined above.

It is preferred that a water-borne latex material for use in the present invention have a pH in the range 4-8, and preferably in the range 6.5-7.5. It is also preferred that the acid number of the latex be moderate, i.e., in the range 18-35. As discussed above, the color-forming materials of the present invention may exhibit tautomerism in which at least one tautomer is colorless and at least another is colored. As noted above, the relative proportion of the colored and colorless tautomers depends upon the chemical environment of the color-forming material. Any color-forming material that migrates from the environment of the color-forming layer (in which it is substantially in the colorless form) into the thermally-insulating layer may experience an environment in which it is more colored. It has been found that this may be a significant problem if the pH or acid number of the latex material fall outside the ranges outlined above.

It is also preferred that water-borne latex materials for use in the present invention contain minimal amounts of small molecules such as cosolvents or surfactants. Such materials may migrate out of the thermally-insulating layer into a color-forming layer and affect the imaging chemistry. If necessary, such small molecules may be removed from the latex material by dialysis, as is well known in the art.

Preferred water-borne latex materials for use in the present invention include NEOCRYL A-6162, a styrene/acrylic material available from DSM NeoResins, Waalwijk, The Netherlands, and CP-655, a styrene/butadiene rubber latex material available from Dow Chemical Co., Midland, Mich.

The mechanical properties of the water-borne latex materials used in the present invention may be improved by crosslinking. As is well known in the art, such crosslinking may be achieved by the use of, for example, thermally-induced covalent bonding by means of polyfunctional epoxides, aziridines, isocyanates, anhydrides, or aldehydes, for example, or by use of reversible mechanisms such as metal chelation. It is also possible that photochemical crosslinking, via, for example, free radical or cationic mechanisms may be used. Crosslinking may be achieved by introduction of a separate reagent or by building the crosslinking functionality into the latex material itself. Other methods for crosslinking, such as the use of electron beams or other sources of radiation, will occur to those of ordinary skill in the art.

The present inventors have found that even with the use of the preferred latex materials, with or without additional crosslinking, the thermal stability of the final image or of the imaging member prior to imaging may still be inadequate for certain demanding applications.

The present inventors have discovered that this situation may be remedied by the incorporation of certain organic materials into the composition of the thermally-insulating layers of the present invention. These materials are preferred to have a Tg in the amorphous form above 80° C. They may be incorporated into the composition either in a crystalline or an amorphous form.

Preferred organic materials for use in the invention are phenolic materials having a molecular weight below 2000. These materials may be crystalline solids with melting point below the activation temperature of the layer overlying the thermally-insulating layer, although this is not a requirement of the invention.

One particularly preferred material for use in combination with a water-borne latex material in compositions of the present invention is 1,3,5-tris(2,6-dimethyl-3-hydroxy-4-tert-butylbenzyl) isocyanurate, a material with a molecular weight of 700, a melting point of 159° C. and a Tg in the amorphous state of 123° C. Another preferred material is 1,1,3-tris(2-methyl-4-hydroxy-5-t-butylphenyl)butane, having a Tg in the amorphous state of 101° C.

The organic phenolic material is ideally incorporated into the thermally-insulating layer by preparing an aqueous dispersion of the material in the crystalline state. This is done by reducing the particle size of a slurry of the crystalline material in water, in the presence of a dispersing aid, by means of a milling process (using, for example, an attritor or a horizontal mill, as is well known in the art). During the milling process, some of the organic phenolic material may be converted from the crystalline to the amorphous state, but preferably this is less than 50% of the material.

When the organic phenolic material that is used is 1,3,5-tris(2,6-dimethyl-3-hydroxy-4-tert-butylbenzyl)isocyanurate, preferably the dispersing aid is a styrene-maleic acid copolymer such as SMA1000 MA, available from Sartomer Company, Inc., Exton Pa., although other materials may also be employed (for example, poly(vinyl alcohol) or small molecule surfactants, as is well known in the art of making dispersions).

The mechanism by which the Dmin is controlled in the compositions of the present invention comprising organic phenolic materials is not fully understood. It is possible that migration of the color-forming materials occurs, but that the chemical environment of the thermally-insulating layer is such that increased coloration does not occur. Alternatively, it is possible that the diffusion rate of the color-forming material within the thermally-insulating layer is decreased, such that less of the material diffuses into the thermally-insulating layer in a given amount of time. It is known that the Tg of the material from which the thermally-insulating layer is made is increased by the addition of the organic phenolic material.

The possible mechanisms discussed above for the efficacy of the use of the organic phenolic materials of the present invention are speculative and presented for illustrative purposes only, and are not intended to limit the scope of the present invention in any way.

As mentioned above, it is preferred that the thermally-insulating layer of the present invention be coatable from an aqueous composition having a solid content of at least about 20% and preferably more than about 30%. The preferred coating methods for manufacture of the thermal imaging members of the present invention are curtain and slide-hopper (bead) coating, and these techniques require that the viscosity of a coating fluid fall within a certain range determined by the desired coating speed, wet coverage, and geometry of the specific coating applicator, as is well known to those skilled in the coating art.

The viscosity of a non-Newtonian fluid such as the coating fluids used in the present invention may be approximated by the Ostwald-de Waele power law:

$$\mu_{eff} = K(S)^{n-1} \quad (2)$$

where $\mu_{eff}$ is the effective viscosity, S is the shear rate, K is a parameter referred to as the flow consistency index and n is a dimensionless quantity known as the flow behavior index that has the value 1 for a Newtonian fluid. Typical coating fluids of the present invention have values of n that are less than 1; i.e., they are shear-thinning fluids. It is preferred in the practice of the present invention that $\mu_{eff}$ lie within the range of 35-200 mPa·s at a shear rate of $1000 \text{ s}^{-1}$, with n in the range 0.8-1, when measured at the temperature of the fluid during coating (which is typically in the range of 20-50° C.). Fluids with viscosity parameters outside these ranges may be difficult to coat using conventional slide-hopper or curtain coating methods.

When the flow behavior index, n, has a value less than about 0.8 the shear thinning behavior of the fluid may make the production of a coating of uniform cross-web thickness difficult. This is because a typical coating applicator is a slot at least as wide as the width of the coating that is fed by a cylindrical hose through a fan-shaped channel. It is important that the flow rate of the fluid be the same at the edges of the applicator as at the center. When the viscosity of the fluid depends strongly upon the shear rate, however, the fluid may exhibit "plug flow", such that the flow rate at the center is greater than at the edges.

In order to formulate an aqueous coating fluid with a solid content of 20-50% by weight of a water-borne latex material of the present invention, having viscosity parameters in the ranges discussed above, it may be necessary to incorporate a rheology modifier in addition to the components that are required for performance of the dried composition. Such a rheology modifier must not, however, affect the performance of the dried composition with respect to its thermal properties or its effect on the stability of the thermal imaging member either prior to printing or in the final image. Unfortunately, many commercially-available materials designed for rheology modification do exhibit undesired effects on the performance of the thermal imaging member. For example, many polyether polyol or acrylate-based rheology modifiers affect the activation temperature of the crystalline color-forming materials. In particular, the activation temperature of the topmost color-forming layer, layer 112 in FIG. 1, may be reduced or made more dependent than it would otherwise be on heating rate (presumably because of diffusion-limited dissolution of the crystalline color-forming material in some of the rheology modifier from the adjacent thermally-insulating layer).

The present inventors have found that the use of a hydrophobically-modified, fully-hydrolyzed poly(vinyl alcohol) polymer as a rheology modifier introduces minimal adverse effects on the performance of the thermal imaging member while allowing the preparation of a coating fluid for the thermally-insulating layer of the present invention with viscosity parameters within the preferred ranges described above.

It has been found by the present inventors that addition of a poly(vinyl alcohol) polymer with hydrophobic modification allows adjustment of $\mu_{eff}$ of a coating fluid containing a water-borne latex of the present invention to higher values than would be obtained in the absence of the polymer, but with less reduction of the flow behavior index, n, than would be possible with the addition of a non-hydrophobically modified poly(vinyl alcohol) polymer or of certain inorganic rheology modifiers such as clay-based materials.

Referring now to FIG. 5, a preferred thermal imaging member 500 according to the invention is shown in schematic form. All layers are coated from aqueous fluids which contain small amounts of a coating aid, Zonyl FSN, available from Dupont Co., Wilmington, Del.

The substrate 502 may be a filled, white, oriented polypropylene base of thickness from about 75 to about 200 microns. Such materials are available, for example, from Yupo Corporation America, Chesapeake, Va. 23320.

Other choices for the film base include paper substrates, poly(ethylene terephthalate), polycarbonate, and other synthetic substrates as are well known in the art. A particularly preferred substrate for use in a label intended for an optical disc is a filled, white polycarbonate with a thickness in the range 25-75 microns.

Color-forming layer 504 may be in direct contact with substrate 502 as shown in FIG. 5, or there may be optional intervening adhesion-promoting or oxygen barrier layers (not shown). Layer 504 is composed of a cyan color-forming compound, Dye X of copending U.S. patent application Ser. No. 12/022,969 (7.72% by weight), 1,4-bis(benzyloxy)benzene (a thermal solvent having melting point 125° C., coated as an aqueous dispersion of crystals having average particle size under 1 micron, 48.6% by weight), a phenolic antioxidant/developer (Anox 29, having melting point 161-164° C., available from Chemtura, Middlebury, Conn., coated as an aqueous dispersion of crystals having average particle size under 1 micron, 7.91% by weight), Lowinox 1790 (a second phenolic antioxidant/stabilizer, available from Chemtura, Middlebury, Conn., coated as an aqueous dispersion of crystals having average particle size under 1 micron, 13.28% by weight), and a binder (a water-borne latex, CP655, available from Dow Chemical Co., Midland, Mich., 22.31% by weight). This layer has a coverage of 2.53 g/m².

Overlying the cyan color-forming layer 504 is a thermally-insulating layer 506 composed of the above-mentioned CP655 (69.9% by weight), the above-mentioned Lowinox 1790 (coated as an aqueous dispersion of crystals having average particle size under 1 micron, the dispersant of which is a styrene-maleic acid copolymer, SMA 1000MA, available from Sartomer Company, Inc., Exton, Pa., 14.25% by weight), a hydrophobically-modified, fully-hydrolyzed grade of poly(vinyl alcohol) POVAL MP103, available from Kuraray America, Inc., Houston, Tex. (13.5% by weight), an aziridine crosslinker, CX-100, available from DSM NeoResins, Waalwijk, The Netherlands, 1.7% by weight, and a surfactant, Alkanol OS, available from E. I. DuPont de Nemours, Wilmington, Del., 0.3% by weight. This layer has a coverage of 18 g/m².

Overlying the thermally-insulating layer 506 is a magenta color-forming layer 508, composed of a magenta color-former, Dye 23 described in copending U.S. patent application Ser. No. 12/343,234, 8.93% by weight; a phenolic ether thermal solvent, 1,4-bis[(4-methylphenoxy)methyl]benzene, (melting point 172° C., coated as an aqueous dispersion of crystals having average particle size under 1 micron, 46.74% by weight); a phenolic antioxidant/developer (Lowinox 44B25, having melting point 210-211° C., available from Chemtura, Middlebury, Conn., coated as an aqueous dispersion of crystals having average particle size under 1 micron, 18.26% by weight);, a second phenolic antioxidant/stabilizer (Lowinox 1790, available from Chemtura, Middlebury, Conn., coated as an aqueous dispersion of crystals having average particle size under 1 micron, 5.13% by weight); and a binder (poly(vinyl alcohol), Celvol 540, available from Celanese, Dallas, Tex., 20.39% by weight). This layer has a coverage of 2.56 g/m².

Overlying the magenta color-forming layer 508 is a second thermally-insulating layer 510, having the same composition as thermally-insulating layer 506. This layer has a coverage of 4 g/m².

Overlying the second thermally-insulating layer 510 is a yellow color-forming layer 512 composed of a yellow color-former (Dye XI described in U.S. Pat. No. 7,279,264, having melting point 202-203° C.), 61.3% by weight, a phenolic antioxidant/stabilizer (Lowinox 1790, available from Chemtura, Middlebury, Conn., coated as an aqueous dispersion of crystals having average particle size under 1 micron, 6.13% by weight), a rheology modifier, the above-mentioned POVAL MP103, 10% by weight, and a binder, Carboset CR717 (a latex available from Lubrizol, Cleveland, Ohio, 22.26% by weight). This layer has a coverage of 2.05 g/m².

Deposited on the yellow color-forming layer 512 is an ultra-violet blocking layer 514 composed of a nanoparticulate grade of titanium dioxide (MS-7, available from Kobo Products Inc., South Plainfield, N.J., 62% by weight), the above-mentioned POVAL MP103 (35% by weight) and glyoxal (3% by weight). This layer has a coverage of 2 g/m².

Deposited on the ultra-violet blocking layer 514 is an overcoat 516 composed of Carboset 526 (a polymeric binder available from Lubrizol, Cleveland, Ohio, 5 parts by weight), the above-mentioned POVAL MP103 (2.12 parts by weight), NEOREZ R-989 (a polyurethane latex, available from DSM NeoResins, Waalwijk, the Netherlands, 4.34 parts by weight), Hidorin F-115P (a meltable lubricant, available from Nagase America Corp., New York, N.Y., 5 parts by weight), Pinnacle 2530, a grade of erucamide, available from Lubrizol Advanced Materials, Inc., Cleveland, Ohio, (1 part by weight), and Ultraflon AD-10 (a poly(tetrafluoroethylene) lubricant available from Laurel Products LLC, Elverson, Pa., 1.72 parts by weight). This layer has a coverage of 1.2 g/m².

The imaging member described above can be printed using techniques such as those described in U.S. Pat. No. 6,801, 233, U.S. patent application Ser. No. 11/400,734, filed Apr. 6, 2006, U.S. Pat. No. 7,408,563, and U.S. patent application Ser. No. 12/022,955, entitled "Print Head Pulsing Techniques for Multicolor Printers", filed Jan. 30, 2008.

The invention will now be described further in detail with respect to specific embodiments by way of Examples, it being understood that these are intended to be illustrative only and the invention is not limited to the materials, amounts, procedures and process parameters, etc. recited herein. All parts and percentages recited are by weight unless otherwise specified.

Reflection optical densities were measured using a spectrophotometer from GretagMacbeth AG, Regensdorf, Switzerland.

The following commercially-available materials were used to prepare the Example coatings:

NEOCRYL A-6162, a styrene/acrylic water-borne latex available from DSM NeoResins, Waalwijk, The Netherlands;

CP-655, a styrene/butadiene rubber latex with Tg 27° C. available from Dow Chemical Co., Midland, Mich.;

PB6692MNA, a styrene/butadiene rubber latex with Tg 1-5° C. available from Dow Chemical Co., Midland, Mich.;

Carboset 526, an acrylic polymer available from Lubrizol, Cleveland, Ohio, used as a solution in aqueous ammonia;

Zonyl FSN, a coating aid available from E. I. duPont de Nenours, Inc., Wilmington, Del.; and Alkanol XC, a surfactant available from E. I. duPont de Nemours, Inc., Wilmington, Del.

NEOREZ R-989, a polyurethane latex, available from DSM NeoResins, Waalwijk, the Netherlands;

Hidorin F-115P, a meltable lubricant, available from Nagase America Corp., New York, N.Y.;

Ultraflon AD-10, a poly(tetrafluoroethylene) lubricant available from Laurel Products LLC, Elverson, Pa.;

Pinnacle 2530, a grade of erucamide, available from Lubrizol Advanced Materials, Inc., Cleveland, Ohio;

Aerosol 501, a surfactant available from Cytec Industries, Inc., West Paterson, N.J.;

Mirataine H30, a surfactant available from Rhodia, Inc. (USA), Cranbury, N.J.; and Aziridine crosslinker CX-100, available from DSM NeoResins, Waalwijk, the Netherlands.

The following dispersions of crystalline, solid materials were used in the Examples.

Dispersion A

A slurry in water of 34% by weight 1,4-bis(benzyloxy) benzene and 6% by weight poly(vinyl alcohol) POVAL 403, available from Kuraray America, Inc., Houston, Tex., was prepared and subjected to grinding in a horizontal mill until 95% of particles were reduced in size to under 1 micrometer.

Dispersion B

A slurry in water of 18.75% by weight Lowinox 1790, available from Chemtura, Middlebury, Conn., and 6.25% by weight of the above-mentioned poly(vinyl alcohol) POVAL 403 was prepared and subjected to grinding in a horizontal mill until 95% of particles were reduced in size to under 1 micrometer.

Dispersion C

A slurry in water of 33.5% by weight Lowinox 1790, available from Chemtura, Middlebury, Conn., and 5.9% by weight poly(vinyl alcohol) Gohseran L3266, available from Nippon Gohsei, Japan, was prepared and subjected to grinding in a horizontal mill until 95% of particles were reduced in size to under 1 micrometer.

Dispersion D

A slurry in water of 32% Lowinox 1790, available from Chemtura, Middlebury, Conn., and 8% by weight styrene-maleic anhydride copolymer SMA 1000MA, available from Sartomer, Inc., Exton, Pa., was prepared and subjected to grinding in a horizontal mill until 95% of particles were reduced in size to under 1 micrometer.

Dispersion E

A slurry in water of 34.2% by weight Anox 29, available from Chemtura, Middlebury, Conn., and 5.8% by weight of the above-mentioned poly(vinyl alcohol) POVAL 403 was prepared and subjected to grinding in a horizontal mill until 95% of particles were reduced in size to under 1 micrometer.

Dispersion F

A slurry in water of 30.6% by weight Dye X of copending U.S. patent application Ser. No. 12/022,969, 5.62% by weight methyl acetate and 4.6% by weight of the above-mentioned poly(vinyl alcohol) POVAL 403 was prepared and subjected to grinding in a horizontal mill until 95% of particles were reduced in size to under 1 micrometer.

Dispersion G

A slurry in water of 1.45% Aerosol 501, 5.24% Mirataine H30, 15.8% by weight Pinnacle 2530 and 1.6% by weight of the above-mentioned poly(vinyl alcohol) POVAL 403 was prepared and subjected to grinding in a horizontal mill until 95% of particles were reduced in size to under 1 micrometer.

EXAMPLE 1

This Example illustrates the thermal stability of an unprinted thermal imaging member of the present invention comprising a cyan color-forming layer in contact with a thermally-insulating layer of the present invention.

A coating fluid for a cyan color-forming layer was prepared by combining the materials shown in the table below in the proportions indicated:

| Ingredient | % solids in fluid |
| --- | --- |
| Carboset 526 | 2.61 |
| Zonyl FSN | 0.04 |
| Dispersion A | 3.55 |
| Dispersion E | 0.59 |
| Dispersion B | 2.67 |
| Dispersion F | 0.58 |

A coating fluid for a thermally-insulating layer (TI-1) of the present invention was prepared by combining the materials shown in the table below in the proportions indicated:

| Ingredient | % solids in fluid |
| --- | --- |
| NEOCRYL A-6162 | 10 |
| Dispersion C | 2.35 |

Coatings were prepared as follows:

Coating A: Cyan color-forming layer was coated onto a filled, white, oriented polypropylene base of thickness 200 microns available from Yupo Corporation America, Chesapeake, Va. to a dried thickness of 4 g/m$^2$.

Coating B: On top of and underneath a cyan color-forming layer of dried thickness of 4 g/m$^2$ on the above-mentioned polypropylene base were provided layers of 1 g/m$^2$ of NEOCRYL A-6162.

Coating C: On top of and underneath a cyan color-forming layer of dried thickness of 4 g/m$^2$ on the above-mentioned polypropylene base were provided layers of 1.28 g/m$^2$ of thermally-insulating layer TI-1 of the present invention.

In order to apply the uppermost layer of TI-1, 0.25% of the coating aid Zonyl FSN was added to the coating fluid.

The change in red reflection density (Dmin) was recorded after coatings A, B and C were subjected to environmental conditioning, as shown in the Table below:

| Condition | Coating A | Coating B | Coating C |
|---|---|---|---|
| 70° C., dry, 17 h | 0.008 | 0.023 | 0.009 |
| 40° C., 90% RH, 17 h | 0.008 | 0.012 | 0.013 |
| 70° C., dry, 17 h, then 40° C., 90% RH, 17 h | 0.015 | 0.057 | 0.023 |

It can be seen that coating C, in which the thermally-insulating layer of the present invention was employed, was more stable than coating B, with a control thermally-insulating barrier containing no organic phenolic material, and almost as stable as coating A, in which there was no thermally-insulating barrier layer.

EXAMPLE 2

This Example illustrates the thermal stability after printing of a thermal imaging member of the present invention comprising a cyan color-forming layer in contact with a thermally-insulating layer of the present invention.

A coating fluid for a cyan color-forming layer was prepared by combining the materials shown in the table below in the proportions indicated:

| Ingredient | % solids in fluid |
|---|---|
| CP-655 | 6.25 |
| Zonyl FSN | 0.056 |
| Dispersion A | 13.6 |
| Dispersion B | 3.72 |
| Dispersion E | 2.21 |
| Dispersion F | 2.16 |

Coating fluids for a thermally-insulating layers TI-2-TI-5 were prepared by combining the materials shown in the table below in the fluid % solids indicated:

|  | TI-2 | TI-3 | TI-4 | TI-5 |
|---|---|---|---|---|
| CP655 | 14.6 | 10.3 | 0 | 0 |
| PB6692MNA | 0 | 0 | 14.6 | 10.3 |
| POVAL MP103 | 2.3 | 2.3 | 2.3 | 2.3 |
| Dispersion D | 0 | 4.3 | 0 | 4.3 |
| Zonyl FSN | 0.06 | 0.06 | 0.06 | 0.06 |
| Alkanol XC | 0.05 | 0.05 | 0.05 | 0.05 |

A coating fluid for a thermally-resistant overcoat was prepared by combining the materials shown in the table below in the proportions indicated:

| Ingredient | % solids in fluid |
|---|---|
| Carboset 526 | 5.07 |
| POVAL MP103 | 2.12 |
| Zonyl FSN | 0.1 |
| NEOREZ R989 | 4.3 |
| Hidorin F115P | 5.0 |
| Ultraflon AD-10 | 1.72 |
| Dispersion G | 1.0 |

Coatings were prepared as follows:
Cyan color-forming layer was coated onto a filled, white, oriented polypropylene base of thickness 95 microns available from Yupo Corporation America, Chesapeake, Va. to a dried thickness of 3 g/m².

On top of the cyan color-forming layer were coated thermally-insulating layers TI-2-TI-5 (four separate coatings) to a dried thickness of 3 g/m².

On top of the thermally-insulating layers was coated a thermally-resistant overcoat to a dried thickness of 1.7 g/m².

Each coating was printed as described in U.S. Pat. No. 6,801,233 to give approximately equally-spaced cyan dye densities varying from 0.07 (Dmin) to 2.00 (Dmax). These images were subjected to environmental conditioning and the changes in dye density that resulted are shown in the table below.

| Condition | TI-2 | TI-3 | TI-4 | TI-5 |
|---|---|---|---|---|
| 60° C., dry, 63 hr, Dmin | 0.41 | 0.01 | 0.59 | 0.01 |
| 60° C., dry, 63 hr, average delta OD | 0.21 | 0.07 | 0.11 | 0.12 |
| 40° C., 90% RH, 63 hr, Dmin | 0.13 | 0.03 | 0.35 | 0.06 |
| 40° C., 90% RH, 63 hr, average delta OD | 0.12 | 0.06 | 0.11 | 0.02 |

It can be seen that coatings TI-3 and TI-5, in which thermally-insulating layers of the present invention were employed, were more stable (i.e., showed less change) than coatings TI-2 and TI-4, the control thermally-insulating barrier containing no organic phenolic material. Coating TI-3, in which the latex CP655, having a Tg of 27° C. was employed, was more stable than coating TI-5, in which the latex PB6692MNA, having a Tg of 1-5° C., was used.

EXAMPLE 3

This example illustrates the use of a variety of grades of poly(vinyl alcohol) as rheology modifiers for coating fluids intended to produce thermally-insulating layers of the present invention.

Six coating fluids (A-F) were prepared using six different grades of poly(vinyl alcohol), each fluid having 33.5% solids content in water. Each fluid was prepared by adding reagents in the order indicated in the table below to water. In each fluid the composition of the solids (and, therefore, of the dried coating) was as follows:

| Poly(vinyl alcohol) | 13.5% |
|---|---|
| CP655 | 69.91% |
| Zonyl FSN | 0.34% |
| Alkanol XC | 0.3% |
| Dispersion D | 14.25% |
| Crosslinker CX-100 | 1.7% |

The poly(vinyl alcohol) grades used were:

| Fluid | PVA grade | % Hydrolysis | Other Modification | Supplier |
|---|---|---|---|---|
| A | Poval MP103 | 98%-99% | Hydrophobically modified | Kuraray America, Houston, TX |
| B | Exceval 4104 | 98%-99% | High EVOH content | Kuraray America, Houston, TX |
| C | Gohseran L3266 | 86.5%-89% | Anionically modified | Nippon Gohsei, Japan |
| D | PVA-403 | 78.5%-81.5% | none | Kuraray America, Houston, TX |

-continued

| Fluid | PVA grade | % Hydrolysis | Other Modification | Supplier |
|---|---|---|---|---|
| E | Mowiol 4-98 | 98%-98.8% | none | Kuraray America, Houston, TX |
| F | Mowiol 4-88 | 86.7%-88.7% | none | Kuraray America, Houston, TX |

The viscosities of fluids A-F were measured using an AR 1000N rheometer, available from TA Instruments, Newcastle, Del., using a cone-and-plate geometry at shear rates from 10-1000 s$^{-1}$ at a temperature of 25° C. The results are shown in the Table below:

| Fluid | $\mu_{eff}$ at 1000 s$^{-1}$ | n | K |
|---|---|---|---|
| A | 72.2 | 0.90 | 142.5 |
| B | 68.5 | 0.41 | 3700 |
| C | 39.8 | 0.37 | 2814 |
| D | 48.2 | 0.46 | 1830 |
| E | 76.9 | 0.39 | 4822 |
| F | 63.2 | 0.45 | 2676 |

It can be seen that only in fluid A is $\mu_{eff}$ within the range of 35-200 mPa·s at a shear rate of 1000 s$^{-1}$, with n in the range 0.8-1. Fluid A contains POVAL MP103, a fully-hydrolyzed poly(vinyl alcohol) with a hydrophobic modification. The other poly(vinyl alcohol) grades tested do not have such a hydrophobic modification.

Although the invention has been described in detail with respect to various preferred embodiments, it is not intended to be limited thereto, but rather those skilled in the art will recognize that variations and modifications are possible which are within the spirit of the invention and the scope of the appended claims.

What is claimed is:

1. A thermal imaging member comprising:
   (A) a substrate having first and second opposed surfaces;
   (B) first and second color-forming layers carried by said first surface of said substrate; said first color-forming layer being closer to said first surface of said substrate than said second color-forming layer; and
   (C) a thermally-insulating layer between said first and second color-forming layers, said thermally-insulating layer comprising at least 50% by weight of a polymeric latex material and at least 5% by weight of an organic material that has a glass transition temperature of at least 80° C.

2. The thermal imaging member of claim 1 wherein said organic material is a phenolic compound with molecular weight less than 2000.

3. The thermal imaging member of claim 1 wherein said organic material is chosen from the group consisting of 1,3, 5-tris(2,6-dimethyl-3-hydroxy-4-tert-butylbenzyl)isocyanurate and 1,1,3-tris(2-methyl-4-hydroxy-5-t-butylphenyl)butane.

4. The thermal imaging member of claim 1, further comprising a third color-forming layer carried by said first surface of said substrate, said third color-forming layer being further from said first surface of said substrate than said second color-forming layer.

5. The thermal imaging member of claim 4, further comprising a second thermally-insulating layer between said second and said third color-forming layers, said second thermally-insulating layer comprising at least 50% by weight of a polymeric latex material and at least 5% by weight of an organic material that has a glass transition temperature of at least 80° C.

6. The thermal imaging member of claim 5 wherein said organic material is a phenolic compound with molecular weight less than 2000.

7. The thermal imaging member of claim 5 wherein said organic material is chosen from the group consisting of 1,3, 5-tris(2,6-dimethyl-3-hydroxy-4-tert-butylbenzyl)isocyanurate and 1,1,3-tris(2-methyl-4-hydroxy-5-t-butylphenyl)butane.

8. The thermal imaging member of claim 5 wherein the square of the thickness of the thermally-insulating layer separating said first and second color-forming layers divided by its thermal diffusivity is at least four times greater than the square of the thickness of said second thermally-insulating layer divided by its thermal diffusivity.

* * * * *

UNITED STATES PATENT AND TRADEMARK OFFICE
CERTIFICATE OF CORRECTION

| | | |
|---|---|---|
| PATENT NO. | : 8,377,844 B2 | Page 1 of 1 |
| APPLICATION NO. | : 12/462421 | |
| DATED | : February 19, 2013 | |
| INVENTOR(S) | : Day et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this
Thirtieth Day of December, 2014

Michelle K. Lee
*Deputy Director of the United States Patent and Trademark Office*